United States Patent Office 3,552,935
Patented Jan. 5, 1971

3,552,935
PURIFYING ALKALI METAL HYDROXIDE BY ZONE-FREE MELTING
Josef Veprek-Siska, Viktor Ettel, and Karel Eckschlager, Prague, Czechoslovakia, assignors to Ceskoslovenska Akademie VED, Prague, Czechoslovakia
No Drawing. Filed May 27, 1968, Ser. No. 732,103
Int. Cl. B01j *17/08;* C01d *1/04*
U.S. Cl. 23—301                                   10 Claims

ABSTRACT OF THE DISCLOSURE

Alkali metal hydroxides of extreme purity are prepared by converting the contaminated hydroxides to the corresponding hydrates which have melting points nearer ordinary temperature than the anhydrous hydroxides, and subjecting the solid hydrates to refining by zone melting. The anhydrous hydroxides may be recovered, if necessary, by the removal of water from the purified hydrates. The process can be performed in containers faced with fluorocarbon or other plastics.

---

This invention relates to the purification of alkali metal hydroxides, and particularly to the preparation of sodium and potassium hydroxide of very high purity suitable for use in transistors, in spectroscopic standards, and for other purposes in which freedom from other metals is critically important.

It has been difficult heretofore to refine sodium and potassium hydroxide to a high degree because of the low solubility of the hydroxides in solvents from which they might be recrystallized, and because of their reactivity. No practical material of construction can contain a melt of sodium or potassium hydroxide for even a short time without contaminating the melt. Purification by chemical means can merely substitute a more acceptable contaminant for a less desirable one. Electrolysis, dialysis, and electrodialysis have been limited in their success, and the conversion of the necessary dilute aqueous solutions to the solid state has introduced new sources of contamination. Purification by fractional crystallization is effective only at impractically low yield, and does not normally reduce the concentration of colloidally dispersed, insoluble contaminants. The hydroxides cannot be purified by zone melting because of their high melting points and the lack of practical container materials inert to the melts.

Very pure alkali metal hydroxides have therefore been prepared heretofore by reacting carefully purified alkali metals with pure water, a costly process not readily performed outside a research laboratory.

We now have found that hydrates of the alkali metal hydroxides have melting points sufficiently near ordinary temperature to permit their purification by zone melting in containers faced with readily available materials which are fully inert to the hydrates at the melting points of the latter, and do not contaminate the same. The relatively small amount of water of hydration is not objectionable in many applications for ultrapure alkali metal hydroxides, and can be removed substantially entirely at low temperature if necessary.

Basically, the method of the invention thus comprises dispersing the alkali metal hydroxide in an amount of water sufficient to form a hydrate of the hydroxide, while keeping the water above the melting point of the hydrate. When the resulting solution is cooled in a confining mold below the melting point of the hydrate, a shaped solid body of the latter is formed. This body is then refined by zone melting in a conventional manner, whereby the impurities are accumulated in one portion of the body and another portion is purified. The two portions are separated, and water may be removed from the purified portion until the hydrate is substantially decomposed to the hydroxide.

During zone melting, the body of the hydrate may be confined in a container having a facing of an organic polymer inert to the molten hydrate. Polytetrafluoroethylene is the preferred facing material, but other polyfluorocarbons, polyamides, and other plastics may be used, particularly with the low-melting hydrate of sodium hydroxide. Facings one millimeter thick or less fully protect a metal container as long as the softening temperature of the plastic is not exceeded by too wide a margin, and do not interfere with heat transfer for zone melting. The contamination inherent in the use of glass, quartz, or metal walls is safely avoided.

The following examples are further illustrative of this invention.

EXAMPLE 1

One kilogram potassium hydroxide pellets of analytical (C.P.) grade containing 86% KOH, 1.04% sodium, 0.00×percent calcium and aluminum, $2.9 \times 10^{-4}$% nickel, $4.6 \times 10^{-4}$% iron, $0.0000 \times$percent magnesium and manganese, and $0.00000 \times$percent copper was mixed with an equimolecular amount of bi-distilled water, and the mixture was heated in a vessel lined with polytetrafluoroethylene to 150° C.

The resulting melt of potassium hydroxide monohydrate was transferred to a glass tube 5 cm. in diameter and 80 cm. long whose bottom was closed, and whose inner wall was coated with a thin facing of polytetrafluoroethylene, and was permitted to solidify in the tube. A narrow annular resistance furnace which encircled the tube was moved along the latter at a rate of about 7 millimeters per hour, and was supplied with electric current of a strength sufficient to heat approximately one tenth of the column of $KOH.H_2O$ in the tube to a temperature of about 160° C. The zone of molten material traveled with the furnace along the column in the usual manner, and impurities were carried along to the end remote from the initially melted end.

After forty traverses of the furnace, the purified end portion of the column consisted of a single, transparent crystal of potassium hydroxide monohydrate. It was cut from the remainder of the solid, shaped body, amounted to 43.4% of the total weight, and was found to contain 75.7% potassium hydroxide, $0.000 \times$percent sodium, and to be free from amounts of calcium, aluminum, iron, magnesium, manganese, and cooper that could be estimated quantitatively by emission spectrography.

It will be understood that $0.000 \times$percent indicates approximately 0.00005% to 0.0005%, and other similar percentage figures in this specification have to be read accordingly. They were arrived at by emission spectrography, and a more precise determination was not considered necessary.

EXAMPLE 2

One kilogram sodium hydroxide pellets of analytical grade (C.P.) was dissolved at room temperature in bidistilled water in a mole ratio of 2:7. The resulting solution was poured into a glass tube internally coated with a thin layer of polyamide resin, and was then solidified by immersing the tube in a mixture of solid carbon dioxide and chloroform. The solid column of $NaOH.3.5H_2O$ had a length of 8 cm. and was subjected to zone refining by passing the tube containing the column through two spacedly juxtaposed annular cooling jackets which maintained 90% of the column at a temperature of −20° C. while a zone between the jackets was permitted to heat to +20° C. by thermal contact with a narrow annular heating jacket. The rate of travel of the tube was 0.5 mm. per hour.

After thirty passages through the heating and cooling zones of the apparatus, approximately one third of the column was converted to a single crystal of $NaOH.3.5H_2O$ which was free of amounts of calcium, aluminum, nickel, iron, magnesium, manganese, and copper that could be determined by emission spectroscopy.

EXAMPLE 3

A polytetrafluoroethylene boat of adequate size was filled with three liters of a 45 percent solution of potassium hydroxide prepared from potassium metal and pure water, but still containing measurable traces of sodium, calcium, aluminum, nickel, iron, magnesium, manganese, and copper. The starting material was considered generally adequate for use in the preparation of transistors.

The boat was inserted in a horizontal glass tube which in turn was enclosed in a glass jacket whose ends were equipped with ground glass joints. The jacket was evacuated to approximately 10 torr by means of an oil diffusion pump and heated by an external coil of resistance wire to hasten evaporation of water from the potassium hydroxide solution without reaching the boiling temperature of the solution. When the residual water was reduced to the amount necessary to form $KOH.H_2O$ with the potassium hydroxide present, the jacket and its contents were permitted to cool until the boat contained a narrow body of solid potassium hydroxide hydrate approximately 100 cm. long.

The inner glass tube and the boat were then removed from the jacket and passed 15 times through an annular furnace at a rate of 5 mm. per hour, approximately one tenth of the length of the hydrate body being kept at 160° C.

After zone melting, a transparent portion could be removed from one end of the hydrate body. It amounted to 44% of the total weight, contained 75.7% KOH, and was free from measurable traces of the aforementioned trace impurities.

EXAMPLE 4

The apparatus described in Example 3 was used for partly evaporating three liters of a 45% sodium hydroxide solution prepared as described in the preceding example. The jacket, which had a capacity of 2 liters, was purged for one hour by a stream of nitrogen free from carbon dioxide and oxygen at a rate of 3 liters per minute. It was then exposed to infrared radiation strong enough to hasten evaporation of water from the sodium hydroxide solution without causing the solution to boil. When the level in the boat had dropped sufficiently to indicate a reduction in the water content to that required to form sodium hydroxide monohydrate, the contents of the boat were permitted to solidify in the nitrogen atmosphere to a solid body 60 cm. long.

The inner tube, the boat, and the solid body of sodium hydroxide monohydrate were then passed through an annular furnace at a rate of 0.7 mm. per hour, whereby a melting zone was heated to 100° C. After 15 passages, a transparent, monocrystalline portion of the hydrate body comprising 38.5% of the total weight and containing 68.9% NaOH was separated from the less pure remainder of the solid body. It was free from the measurable amounts of potassium, calcium, aluminum, nickel, iron, magnesium, manganese, silver, and copper that had been found in the starting material by spectroscopic analysis.

EXAMPLE 5

Sodium hydroxide considered pure enough as an analytical standard and containing 99% NaOH and 0.0002% potassium was mixed in a vessel lined with polytetrafluoroethylene with an amount of conductivity water sufficient to produce 1600 g. $NaOH.H_2O$ with the sodium hydroxide present. The mixture was heated to 100° C. to form a homogeneous liquid which was poured into two polytetrafluoroethylene boats, and the boats were placed in glass tubes through which pure nitrogen was passed while the melts were permitted to solidify.

The boats were horizontally passed at a rate of 0.3 millimeter per hour through twin zone melting device having each three resistance furnaces spaced 18 cm. apart. The molten zones were two to six centimeters wide. After 25 passages, the transparent end portions of the hydrate bodies were separated from the less pure remainders, fused at 100° C., and poured into a single plastic boat. The resultant single body of purified sodium hydroxide hydrate was subjected to zone refining in the same apparatus, and the pure portion of the refined body, amounting to 20% of its total weight was separated for further use.

It contained 68.9 percent sodium hydroxide, and did not contain detectable amounts of potassium.

EXAMPLE 6

Potassium hydroxide monohydrate purified by the method of Example 1 was fused in an atmosphere containing at least 99.9% nitrogen and not more than 0.05% carbon dioxide, and was then poured into a polytetrafluoroethylene boat which was placed in a glass tube equipped with ground seals at both ends. While the contents of the tube were heated to 200° to 300° C. by an external heating element, nitrogen purified by passage through concentrated sulfuric acid potassium hydroxide solution, and a tower packed with solid KOH was passed through the tube at an absolute pressure of 5 to 20 mm. Hg.

Water was evaporated into the partial vacuum in the tube from the potassium hydroxide hydrate melt in the plastic boat until the liquid level in the boat indicated a KOH content of approximately 85%. The contents of the boat were then permitted to solidify by cooling, and were analyzed. 85.6% potassium hydroxide, 0.0002% sodium, 0.03% $CO_3''$, and traces of Ca, Al, Ni, Fe, Mg, Mn, Cu, Zn, Cd, and Ag too small to permit quantitative estimation were found. The material thus contained no more water than the grade of potassium hydroxide usually referred to as "analytical" or "C.P." (chemically pure), while being much lower in impurities other than water.

EXAMPLE 7

The apparatus described in Example 3 was used for partly evaporating three liters of a 20% cesium hydroxide solution prepared by slow mixing of hot saturated solutions of cesium sulphate and barium hydroxide and subsequent separation of precipitated $BaSO_4$ by filtration. The solution contained 0.006% of sodium and potassium, 0.0002% Ca, 0.0005% Fe, 0.2% of Ba as barium hydroxide has been used in slight excess to cesium sulphate.

The solution was evaporated by the method of Example 3. When the residual water was reduced to the amount necessary to form $CsOH.H_2O$ with the cesium hydroxide present, the jacket and its content were permitted to cool until the boat contained a narrow body of solid cesium hydroxide hydrate approximately 60 cm. long.

The inner glass tube and the boat were then removed from the jacket and passed 20 times through an annular furnace at a rate of 3 mm. per hour, approximately one tenth of the length of the hydrate body being kept at 190° C.

After zone melting, a transparent portion could be removed from one end of the hydrate body. It amounted to 36% of the total weight, contained 89.3% CsOH, and was free from measurable traces of the aforementioned trace impurities.

What is claimed is:
1. A method of purifying the hydroxide of an alkali metal which comprises:
   (a) dispersing said hydroxide in an amount of water sufficient to form a hydrate of said hydroxide while keeping said water at a temperature above the melting point of said hydrate, whereby said hydroxide is dissolved;
(c) cooling the solution so obtained in a mold to a temperature below said melting point, whereby said solution solidifies into a shaped, solid body of said hydrate;
(c) refining said body by zone melting, whereby a portion of said body is purified; and
(d) separating the purified portion from the remainder of said body.

2. A method as set forth in claim 1, wherein water is removed from said purified portion until said hydrate is substantially decomposed to said hydroxide.

3. A method as set forth in claim 1, wherein said body is confined during said zone melting in a container having a facing of an organic polymer inert to said hydrate at the temperature of said zone melting.

4. A method as set forth in claim 3, wherein said temperature is not substantially higher than the softening temperature of said polymer.

5. A method as set forth in claim 3, wherein said polymer is polytetrafluoroethylene.

6. A method as set forth in claim 1, wherein said alkali metal is sodium.

7. A method set forth in claim 6, wherein said hydrate is $NaOH \cdot H_2O$.

8. A method as set forth in claim 6, wherein said hydrate is $NaOH \cdot 3.5H_2O$.

9. A method as set forth in claim 1, wherein said alkali metal is potassium.

10. A method as set forth in claim 9, wherein said hydrate is $KOH \cdot H_2O$.

References Cited

UNITED STATES PATENTS

| | | | |
|---|---|---|---|
| 3,291,576 | 12/1966 | Othaleh | 23—302 |
| 3,301,660 | 1/1967 | Imamura et al. | 23—301 |
| 3,477,829 | 11/1969 | Dockendorff et al. | 23—302 |

NORMAN YUDKOFF, Primary Examiner

S. SILVERBERG, Assistant Examiner

U.S. Cl. X.R.
23—185, 302